(12) United States Patent
Haines et al.

(10) Patent No.: US 7,043,523 B2
(45) Date of Patent: May 9, 2006

(54) SELF-ADJUSTING CONSUMABLE ORDER-ASSISTANCE SYSTEM AND METHOD

(75) Inventors: Robert E. Haines, Boise, ID (US); Mary B. Baumunk, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 09/738,792

(22) Filed: Dec. 13, 2000

(65) Prior Publication Data

US 2002/0073148 A1     Jun. 13, 2002

(51) Int. Cl.
*G06F 13/00* (2006.01)
*G06F 17/60* (2006.01)

(52) U.S. Cl. ............... 709/203; 709/217; 705/26

(58) Field of Classification Search ............. 709/217, 709/220, 224, 243, 244, 208, 221, 204, 229, 709/200–203, 218–219; 705/27, 28, 26, 705/29; 399/8, 12, 23, 24
See application file for complete search history.

(56) References Cited

U.S. PATENT DOCUMENTS

| | | | | |
|---|---|---|---|---|
| 5,305,199 | A * | 4/1994 | LoBiondo et al. | 705/28 |
| 6,003,078 | A * | 12/1999 | Kodimer et al. | 709/224 |
| 6,020,973 | A * | 2/2000 | Levine et al. | 358/1.15 |
| 6,170,007 | B1 * | 1/2001 | Venkatraman et al. | 709/218 |
| 6,204,763 | B1 * | 3/2001 | Sone | 340/568.1 |
| 6,275,664 | B1 * | 8/2001 | Wolf et al. | 399/8 |
| 6,301,012 | B1 * | 10/2001 | White et al. | 709/221 |
| 6,327,613 | B1 * | 12/2001 | Goshey et al. | 709/208 |
| 6,333,790 | B1 * | 12/2001 | Kageyama | 358/1.15 |
| 6,341,271 | B1 * | 1/2002 | Salvo et al. | 705/28 |
| 6,493,517 | B1 * | 12/2002 | Hanson | 399/11 |
| 6,529,936 | B1 * | 3/2003 | Mayo et al. | 709/202 |
| 6,535,865 | B1 * | 3/2003 | Skaaning et al. | 370/389 |
| 6,629,134 | B1 * | 9/2003 | Hayward et al. | 709/217 |
| 6,684,119 | B1 * | 1/2004 | Burnard et al. | 705/28 |
| 6,798,997 | B1 * | 9/2004 | Hayward et al. | 709/224 |

* cited by examiner

Primary Examiner—Moustafa M. Meky

(57) ABSTRACT

A consumable order-assistance system is provided for computer peripheral devices. The system includes a personal computer, at least one computer peripheral device, and a user interaction site. The personal computer has a messaging system. The at least one computer peripheral device has a messaging system. The communication link signal couples the personal computer with a provider of a consumable for the computer peripheral device. The user interaction site is configured to receive a notification from the computer peripheral device via the messaging system of a need to order a consumable. The user interaction site is provided within one of: a single-connection environment as an end user interface; an unmanaged network environment as a workgroup administrator interface; and a server-based centralized network environment as a centralized system administrator interface. A method is also provided.

15 Claims, 5 Drawing Sheets

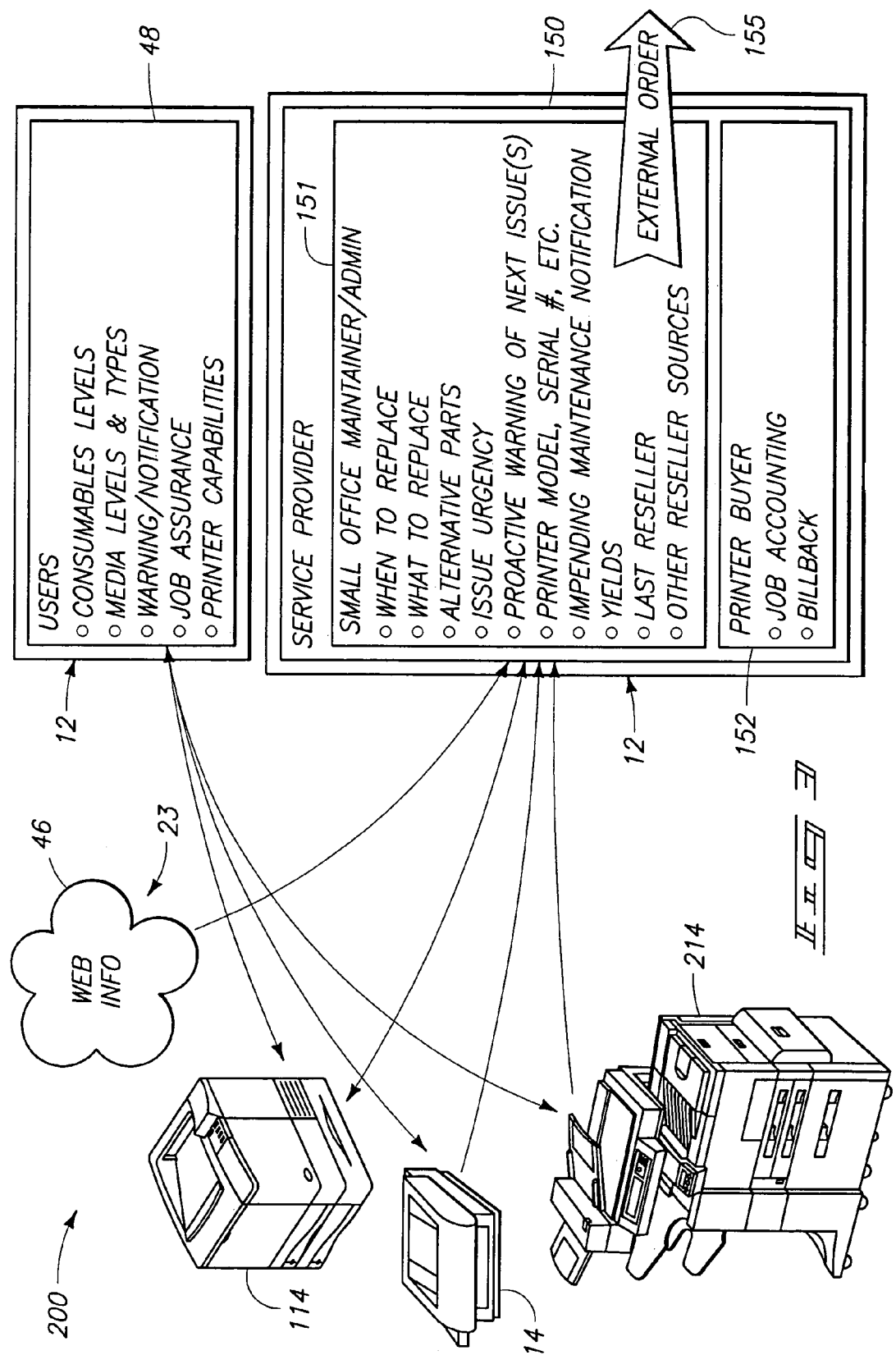

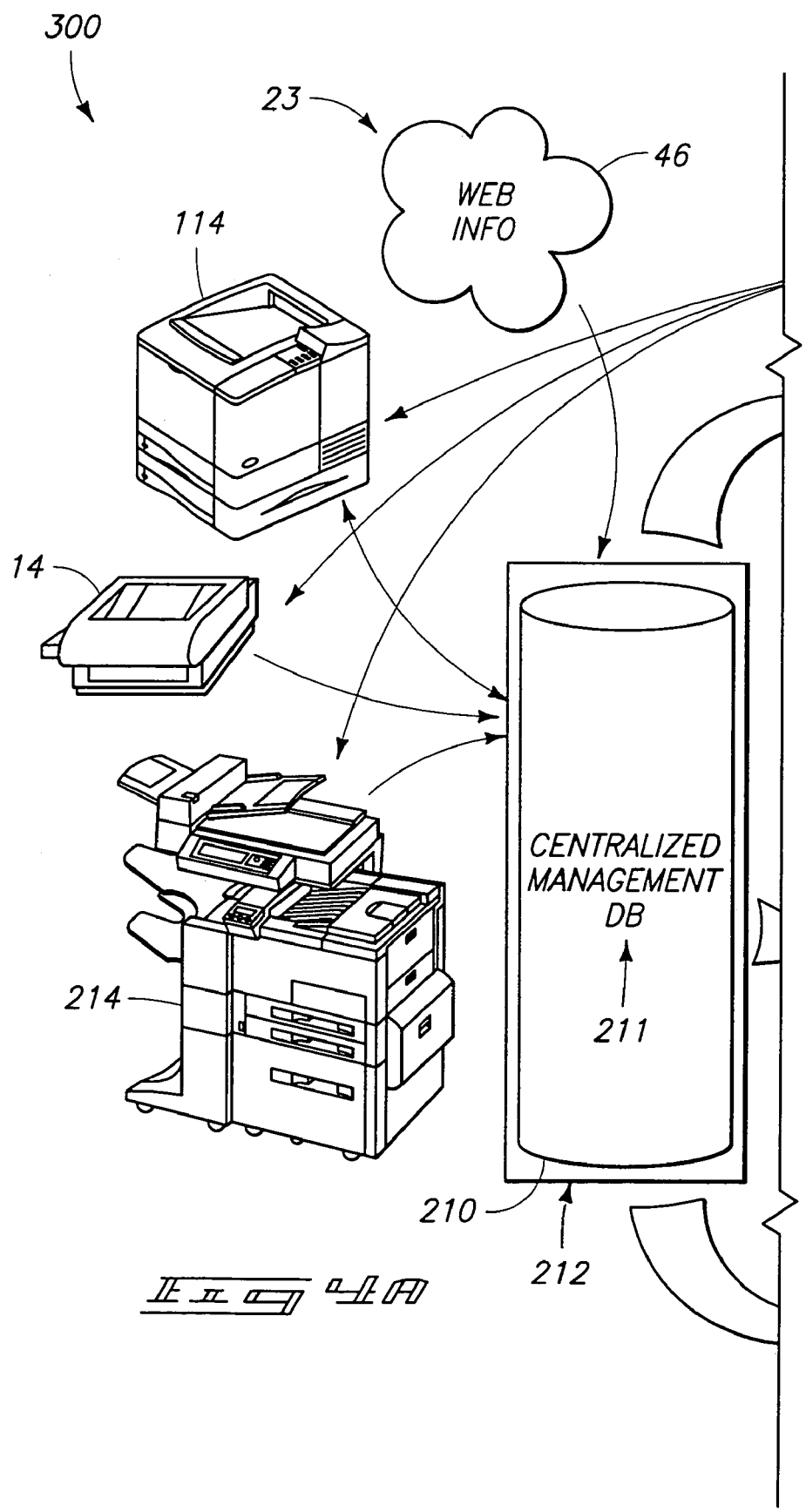

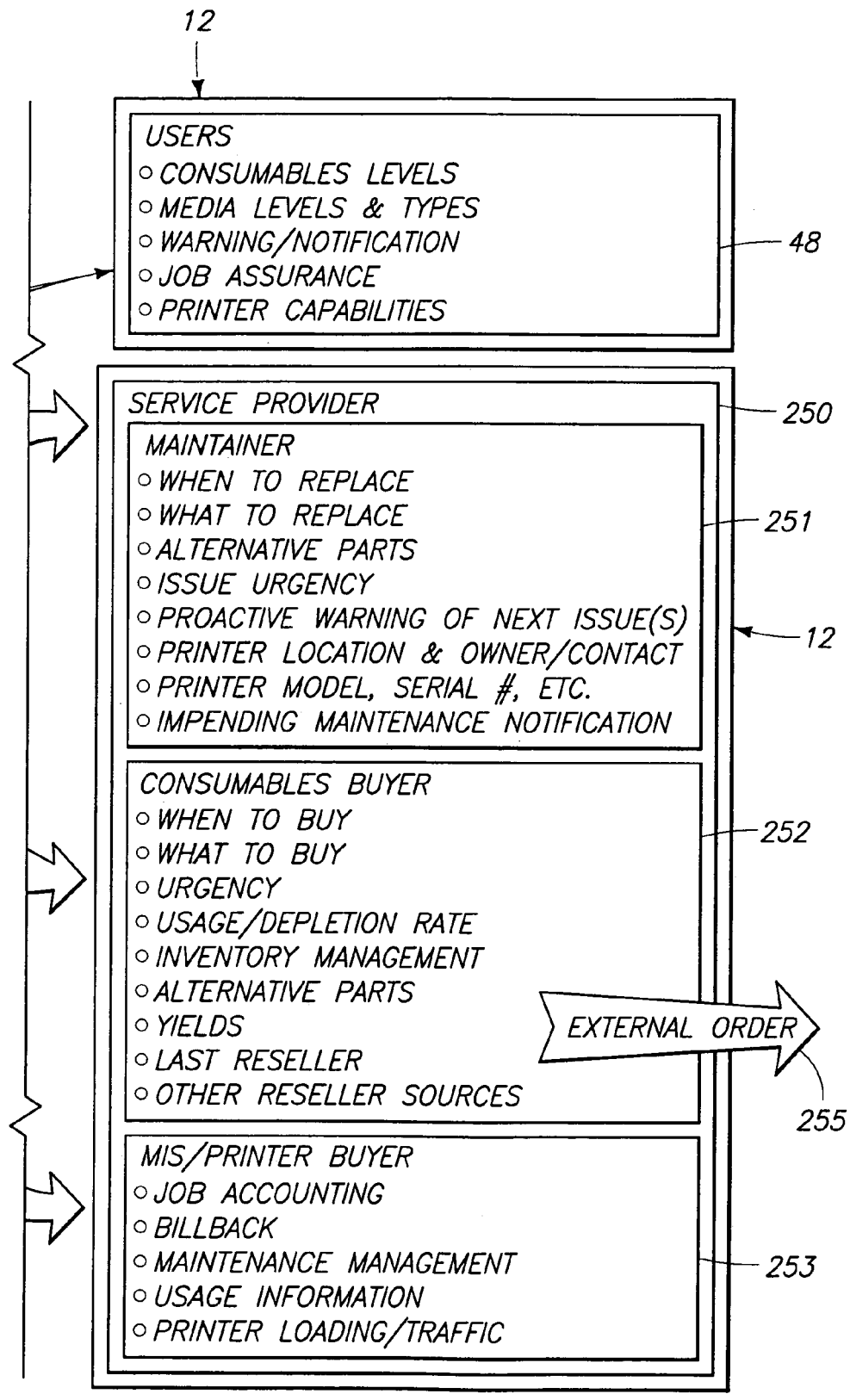

SELF-ADJUSTING CONSUMABLE ORDER-ASSISTANCE SYSTEM AND METHOD

FIELD OF THE INVENTION

This invention pertains to computers and computer peripheral devices that utilize consumables. More particularly, this invention relates to rendering of assistance when ordering consumables to replenish consumables that are being depleted by a computer peripheral device that communicates with a computer and is readily configured for use within a single-connection environment, an unmanaged network environment, or a centralized enterprise network environment

BACKGROUND OF THE INVENTION

As computer systems have gained widespread use, particularly within home, office and network environments, the use of computer peripheral devices has increased significantly. Likewise, the utilization of consumables for such computer peripheral devices has also increased significantly. One problem often encountered with any computer system results because consumables are manually ordered by a user either when they run out of a consumable, or when the computer peripheral device or associated personal computer notifies the user that the consumables have been or are about to be depleted.

One such environment comprises a home environment including a personal computer (PC) and a dedicated computer peripheral device such as a printer that is coupled with the PC via a local (or system) bus. Such an environment has been referred to as a single-connection environment, and is exclusive of a computer network environment, but may include a connection to an external network such as the Internet. Another environment comprises an unmanaged network environment including a personal computer (PC), an unmanaged network, and a computer peripheral device having an embedded web server. Yet another environment comprises a managed, enterprise network environment including a server, one or more personal computers (PCs), and one or more computer peripheral devices.

The ordering of consumables for computer peripheral devices within any one or more of the above environments has previously been a manual process. For example, consumables are manually ordered by single-connection environment users for photo copiers, facsimile machines, printers and multiple function peripheral devices that include more than one of these functional devices. Due to the wide adoption of such devices within these environments, a need exists to be able to more easily and accurately order consumables to replenish depleted consumables. For example, a need exists to assist in ordering of paper, toner, toner supply cartridges, ink, and ink reservoirs. Furthermore, a need exists for a solution that can be readily configured to suit a customers needs, and a specific environment.

The ability to enhance ordering of consumables and perform maintenance in a manner that provides multiple levels of functionality so as to facilitate use with a number of different environments would greatly increase the user experience and minimize the time and effort needed to maintain consumables and keep computer peripheral components functional. Accordingly, it is desirable to enhance the ease and speed with which consumables are replenished and/or replaced so that adequate supplies of consumables are available for a computer peripheral device when such consumables are sufficiently depleted so as to warrant replenishment.

SUMMARY OF THE INVENTION

A self-adjusting consumable order-assistance system is easily configured for use in multiple environments including a single-connection environment, an unmanaged network environment, and a centralized, server-based network environment.

According to one aspect, a consumable order-assistance system is provided for computer peripheral devices. The system includes a personal computer, at least one computer peripheral device, and a user interaction site. The personal computer has a messaging system. The at least one computer peripheral device has a messaging system. The communication link signal couples the personal computer with a seller, reseller or other provider of a consumable for the computer peripheral device. The user interaction site is configured to receive a notification from the computer peripheral device via the messaging system of a need to order a consumable. The user interaction site is provided within one of: a single-connection environment as an end user interface; an unmanaged network environment as a workgroup administrator interface; and a server-based centralized network environment as a centralized system administrator interface.

According to another aspect, a computer-implemented self-adjusting consumable order-assistance system is provided which implements a program in which consumable components of computer peripheral devices are replenished. The system includes a personal computer, at least one computer peripheral device, a communication link, and a user interface. The personal computer has a messaging system. The at least one computer peripheral device has a messaging system. The communication link signal couples the personal computer with a provider of a consumable. The user interface comprises an end user interaction interface, a workgroup administrator interface, or a centralized system administrator interface. The end user interaction interface includes the personal computer configurable for interaction by a user that is exchanging information with a computer peripheral device associated with the personal computer. The workgroup administrator interface is operative to manage one computer peripheral device at a time. The centralized system administrator interface communicates with a server of a centralized network environment.

According to yet another aspect, a method of providing order assistance is provided. The method includes: providing a computer peripheral device, a personal computer having a communication link with a provider of a consumable, a messaging system extending between the computer peripheral device and the personal computer, and a user interaction site; determining an environment in which the computer peripheral device and the personal computer are provided by detecting the presence of a parallel cable or the presence of a network environment; for the case where the presence of a network environment is detected, further broadcasting a discovery protocol to detect the presence of a centralized order-assistance solution; and based on the determined environment, providing the user interaction site in the form of: a user interface when the network environment comprises a single-connection environment; an embedded web server when the network environment comprises an unmanaged network environment; and a centralized system administrator interface when the network environment comprises a server-based, centralized network environment.

Other features and advantages of the invention will become apparent to those of ordinary skill in the art upon review of the following detailed description, claims, and drawings.

DESCRIPTION OF THE DRAWINGS

Preferred embodiments of the invention are described below with reference to the following accompanying drawings depicting examples embodying the best mode for practicing the invention.

FIG. 3 is a simplified block diagram of the consumable order-assistance system of FIG. 1 as applied to an unmanaged, small network environment.

FIGS. 4A and 4B provide a simplified block diagram of the consumable order-assistance system of FIG. 1 as applied to an enterprise environment.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention as applied to three different environments. While the invention is described by way of preferred embodiments, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
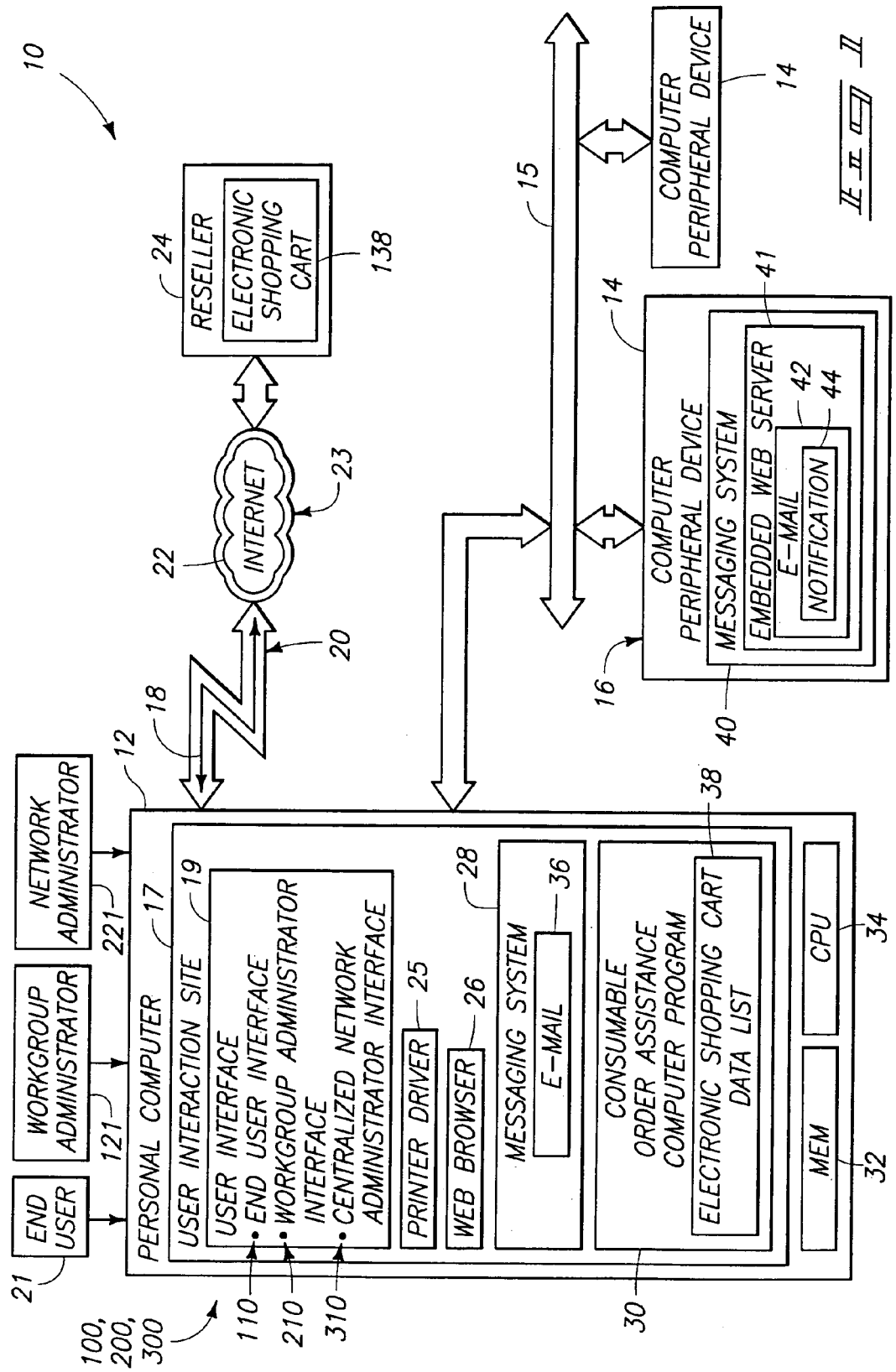
FIG. 1 is a simplified block diagram of a self-adjusting consumable order-assistance system within a generic environment including a personal computer (PC) and a plurality of computer peripheral devices that are coupled together with a local bus, and wherein the personal computer (PC) includes a communication link with an external network such as the Internet, in accordance with one embodiment of the present invention.

FIG. 1 is a simplified block diagram of a self-adjusting consumable order-assistance system 10 within one of three unique environments 100, 200, and 300 including a personal computer (PC) 12 and one or more computer peripheral devices 14 that are coupled together with PC 12 via a bus 15. Details of a single-connection environment 100 are described below in greater detail with reference to FIG. 2. Details of an unmanaged network environment 200 are described below in greater detail with reference to FIG. 3. Details of a server-based, centralized network environment 300 are described below in greater detail with reference to FIGS. 4A and 4B.

According to one embodiment, computer peripheral device 14 comprises a printer 16, such as a laser printer. Personal computer (PC) 12 comprises a user interaction site 17 that includes a user interface 19, a printer driver 25, a web browser 26, a messaging system 28 and a consumable order assistance computer program 30. PC 12 also comprises a memory 32 and a central processing unit (CPU) 34.

A communication link 18, in one form an Internet connection 20, interconnects PC 12 with an external network 22 such as the Internet 23. The Internet 23 connects together a reseller 24 of consumables with PC 12 via communication link 18. According to single-connection environment 100 of FIG. 2, an end user 21 (of FIG. 1) interacts via PC 12 (of FIG. 1) with user interaction site 17 (of FIG. 1) provided in the form of an end user interface 110 (of FIG. 1). According to unmanaged network environment 200 of FIG. 3, a workgroup administrator 121 (of FIG. 1) interacts via PC 12 (of FIG. 1) with user interaction site 17 (of FIG. 1) in the form of a workgroup administrator interface 210 (of FIG. 1). According to server-based, centralized network environment 300 of FIG. 4, a network administrator 221 (of FIG. 1) interacts via PC 12 (of FIG. 1) with user interaction site 17 (of FIG. 1) in the form of a centralized network administrator interface 310 (of FIG. 1).

According to one construction, messaging system 28 comprises an email application program 36. Additionally, consumable order assistance computer program 30 comprises an electronic shopping cart data list 38 which provides a pre-formatted arrangement of data for an electronic shopping cart 138 within a web site of provider 24. Data list 38 formats data that is needed to fill in shopping cart 138, such as order information identifying a consumable and order location information for the consumable.

As used herein, the term "electronic shopping cart" refers to a piece of software that functions as a catalog and ordering process for an online reseller store. A shopping cart provides an interface between a company's web site and deeper web site infrastructure. More particularly, the electronic shopping cart enables a customer to select merchandise, review selected items, make modifications or additions to an order, and purchase merchandise. Shopping carts are presently commercially available, and are sold as independent pieces of software, wherein companies integrate a shopping cart into a specific online solution. Alternatively, shopping carts can be offered as a feature from a service provider that creates and hosts a company's e-commerce site.

Computer peripheral device 14 also comprises a messaging system 40. Messaging system 40 comprises an e-mail application program 42. E-mail application program 42 is configured to send notifications to a user at PC 12 indicating a need to order a consumable at computer peripheral device 14.

Figure 2:
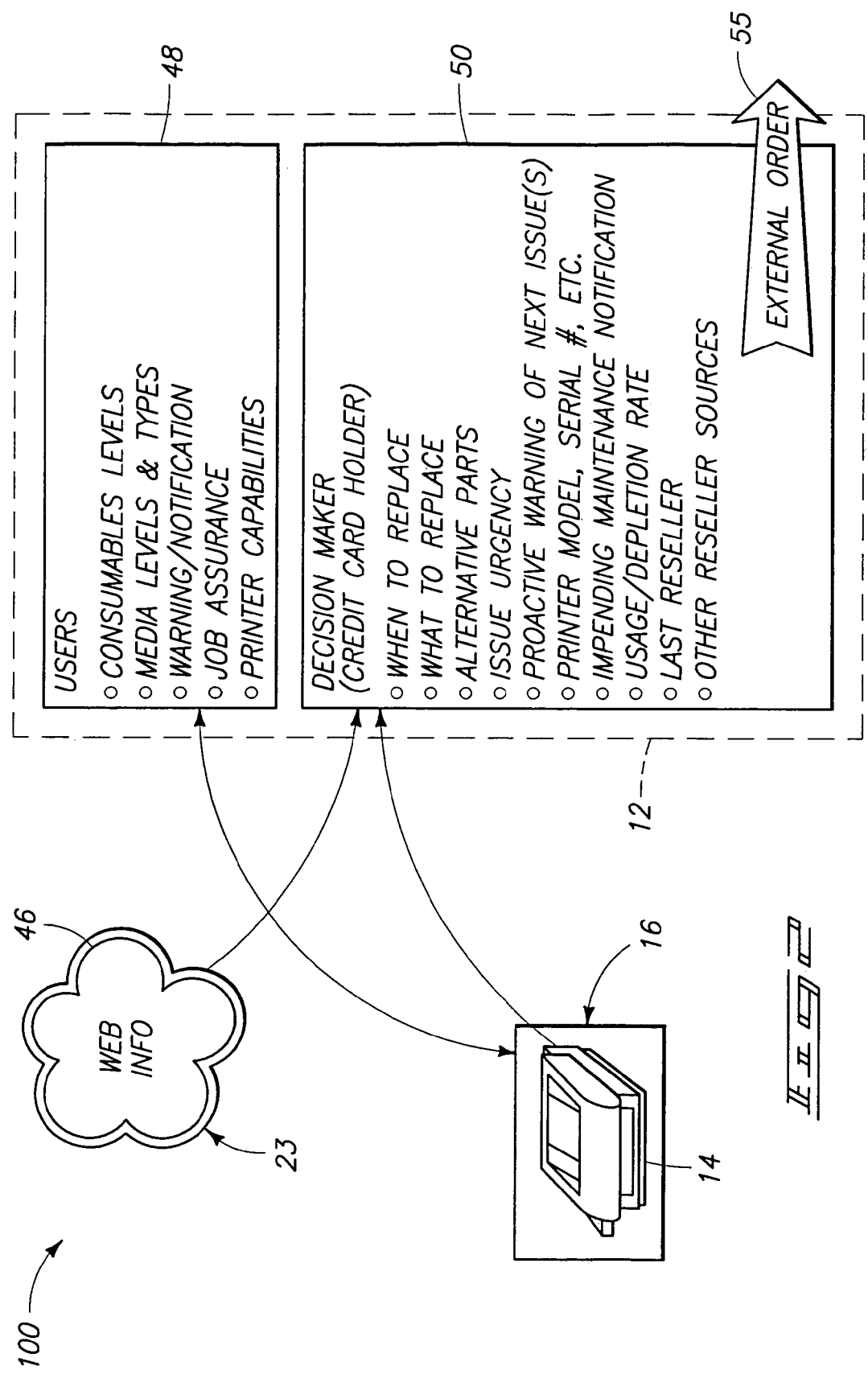
FIG. 2 is a simplified block diagram of the consumable order-assistance system of FIG. 1 as applied to a home or single-connection environment.

When the environment comprises a single-connection environment 100 (as shown in FIG. 2), bus 15 comprises a local bus. When the environment comprises an unmanaged network environment 200, bus 15 comprises a network connection or network pathway (or channel) extending between multiple devices within a common network. When the environment comprises a managed, enterprise network environment 300, bus 15 comprises an enterprise network connection or pathway extending between multiple devices and servers within one or more interconnected networks.

Consumable order-assistance system 10 includes PC 12, at least one peripheral device 14, communication link 18, and consumable order assistance computer program 30. PC 12 has web browser 26 and messaging system 28 which cooperates with messaging system 40 of peripheral device 14. Communication link 18 signal couples PC 12 with reseller, or provider, 24 of at least one consumable for peripheral device 14 using web browser 26. In operation, consumable order assistance computer program 30 is configured to receive a notification 44 from peripheral device 14 via messaging system 40 of a need to order a particular consumable, alert a user of PC 12 of notification 44, and provide an order location to the user for the consumable.

In one case, program 30 is further configured to collect a series of notifications from one or more peripheral devices 14, and summarize the series of notifications 44.

Even furthermore, program 30 can be further configured to provide an electronic shopping cart in order to enable electronic ordering of a consumable from PC 12 via communication link 18 from reseller 24. Hence, electronic ordering of the consumable can occur from one or more resellers 24 via Internet 23. In one case, program 30 is designed to prompt a customer, or user, of PC 12 for authorization information before submitting an order for at least one consumable via Internet 23 with reseller 24.

Communication link 18 can be provided in a number of different configurations. In one case, communication link 18 comprises an electronic communication link that enables program 30 to submit an e-mail order with reseller 24. In another case, communication link 18 comprises an electronic communication link that enables program 30 to submit a facsimile order with reseller 24. In yet another case, communication link 1 8 comprises an electronic communication link that enables program 30 to submit a web page purchase using a web site of reseller 24. In even another case, communication link 18 comprises an electronic communication link that enables program 30 to submit a telephone order with reseller 24.

System 10 is configured to automate the order process for consumables for several unique environments. Additionally, the maintenance, or care and feeding, of computer peripheral devices such as printers is automated with system 10. System 10 is relatively easily reconfigured to accommodate multiple unique environments, wherein system 10 is changed to accommodate the complexity of the environment where system 10 is to be installed.

System 10 comprises a self-adjusting order-assistance system that can be configured with one or more of three components. First, system 10 can include an end user interaction piece. Secondly, system 10 can include a workgroup administrator interface. Thirdly, system 10 can include an information technology (IT) professional centralized administrator interface.

FIG. 2 illustrates single-connection environment 100 where user interface 19 (of FIG. 1) is configured as an end user interface 110 which provides an end user interaction piece. In one case, printer driver 25 of PC 12 provides the end user interface 110. In another case, end user interface 110 is provided by a computer user interface. Irrespective of the case, end user interface 110 is the point of interaction for an end user each time the end user generates a print job for printer 16.

FIG. 3 illustrates unmanaged network environment 200 where user interface 19 (of FIG. 1) is configured as a workgroup administrator interface 210. In one case, workgroup administrator interface 210 comprises an embedded web server (EWS) of computer peripheral device 14 (of FIG. 1). Interface 210 is informal in the sense that interface 210 only manages one printer 16 at a time. Interface 210 is typically the most common interface within a small office environment, or within a small workgroup administration.

FIG. 4 (combining FIGS. 4A and 4B) illustrates server-based, centralized network environment 300 where user interface 19 (of FIG. 1) is configured as a centralized network administrator interface 310 which provides an information technology (IT) professional centralized administrator interface. Such an interface 310 is provided by a software utility such as Web JetAdmin, available from Hewlett-Packard Company, of Palo Alto, Calif.; TopTools, available from Hewlett-Packard Company, of Palo Alto, Calif.; or a Tivoli management software application for e-business applications, available from Tivoli Systems, Inc., of Austin, Tex.

As an example, TopTools comprises a web-based tool that helps a user or administrator manage computer assets, upgrade PC BIOS and drivers, manage network devices and printers, and keep track of network resources and performance. Based on industry standards such as DMI, SNMP, WMI, TCP/IP and HTTP, TopTools will increase efficiency by providing immediate device status from any location in a computer environment. Such tools are typically used by a formal system or network administrator, such as someone who holds the title of network administrator.

Referring to FIG. 2, a single-connection environment 100 is one where only a single person or user using a single PC 12 has access to a computer peripheral device 14. One example comprises a single-connection home environment. In such case, an end user interface 110 is provided comprising an end user interaction piece which forms the interface for a consumable order-assistance system 10 (see FIG. 1). For example, a user comprises someone printing at home using a single PC that is connected to a single printer, and wherein the printer runs low of toner. The consumable order-assistance system then prompts the user using the printer driver 25 (see FIG. 1), or the user is notified during the print job that the printer is running low of toner. During such notification, the system indicates the part number of the consumable and provides a uniform resource locator (URL), which enables the user to place an order via the PC and through the Internet with the reseller of the consumable. The user merely needs to click on the URL in order to cause the transfer of electronic shopping cart data list 38 to electronic shopping cart 138 (see FIG. 1). The shopping cart is then filled with the consumable information that needs to be ordered, and the user merely needs to check out of the reseller's website.

Referring to FIG. 3, in a small workgroup environment 200 with no formal centralized administration software, embedded web server 41 provides an interface by cooperating with workgroup administrator interface 210 (see FIG. 1) to the order-assistance system 10 (of FIG. 1). At the same time, end user interface 110 of user interface 19 (of FIG. 1) is turned off or modified so that the provided user interface is not duplicated functionally. For example, a small law office includes a secretary that receives email from embedded web server 41 of computer peripheral device 14, thereby prompting an order which is submitted to the secretary at a PC. The prompt provides information on what consumable to order, when to order the consumable, and where to order the consumable. By providing such information to the secretary, attorneys within the office do not receive any prompt to order consumables. However, in the event that the printer does run too low of toner, the attorneys can be notified of status which shows that an order has been fulfilled by the secretary submitting such order using the embedded web server to submit an order with a reseller via the Internet.

Referring to FIG. 4, a professional information technology (IT) department is shown within a large network environment 300. A centralized order-assistance tool was installed within environment 300, wherein interactions at an end user level and an embedded web server (EWS) level are rendered in the form of an operating status, or alternatively, may even be turned off. Instead, the person acting as a centralized purchaser receives a notification, in the form of email or some other messaging form, at regular intervals. For example, such regular intervals might comprise receiving an email weekly, monthly, or at some other interval. The notification includes information on which consumables need to be replenished or stocked, how many consumables need to be stocked, the part numbers of the consumables, and locations where the purchaser can place an order for the consumables. For example, an electronic URL link can be provided to the purchaser, indicating a place for ordering a consumable.

On a printer-by-printer basis, a maintainer would receive an email that lists the devices for which maintenance, care, and/or feeding of parts or consumables is presently needed. A maintainer comprises an individual whose job it is to care for, maintain, and feed (or replenish) a computer peripheral device, such as a printer.

Several techniques are available for notifying a maintainer of a need for maintenance, consumable replenishment and repair. According to one technique, an email is generated from each individual printer whenever the printer needs attention, maintenance or replenishment. According to another technique, a consolidated email is generated once per day listing all the printers within the environment that need attention within the next upcoming day.

According to a third technique, consolidation is carried out once per day, and an email is generated and delivered to a secondary address based upon the level of urgency relating to the maintenance or replenishment problem. For example, a "toner low" condition could trigger a consolidated email, whereas a "toner out" condition is immediately emailed to a user's pager number immediately following the occurrence of the "toner out" condition.

Accordingly, an order-assistance system has multiple parts which are configurable to optimize operation of the system with one of several environments. If a printer is connected via a parallel cable, the system determines that it is present within a single-connection environment, and the system is configured to interact at an end user level.

If the printer is in a network environment, the system broadcasts a discovery protocol to all devices within the environment in order to determine if a centralized solution is present within the environment. Such action is similar to a printer finding a dynamic host configuration protocol (DHCP) server in order to receive an Internet protocol (IP) address or a Jet or JetAdmin Discovery printer devices on the network. DHCP comprises software that automatically assigns IP addresses to client stations logging onto a TCP/IP network. If no centralized order-assistance solution is discovered, the ordering interaction takes place via the embedded web server (EWS). If the centralized order-assistance solution is discovered, the central solution takes control, and the EWS and the end user pieces show status only to a user.

One advantage of the system is that the system keeps the same functionality from being redundantly deployed, thereby preventing duplication of orders or bypassing of a centralized process.

In order to replenish consumables using system 10 of FIG. 1, program 30 cooperates with the system components of FIG. 1 to provide a notification system, a facilitation system, a consolidation system, an authorization system, and an order-assistance system. Not all of such systems are needed when implementing system 10 in different environments, such as the environments provided in FIGS. 2–4.

FIG. 2 illustrates a first environment 100 for which consumable order-assistance system of FIG. 1 can be configured to have a first set of functionality levels for a home or single-connection environment. As shown in FIG. 2, web information 46 is provided via the Internet 23. The computer peripheral device 14, comprising a printer 16, is interconnected with a local bus (not shown) with a PC 12. One or more users 48 of PC 12 interact with peripheral device 14 to obtain information on consumable levels, media levels and types, warnings and/or notifications, job assurance, and printer capabilities. A decision maker 50, in one case one of the users, also interacts with peripheral device 14 via PC 12. In one case, decision maker 50 comprises a credit card holder who is going to act as a purchaser in order to purchase consumables over Internet 23 from a reseller. Decision maker 50 interacts with peripheral device 14 to determine when to replace consumables, what consumables to replace, alternative parts that are needed, issue urgency, proactive warning of next issue(s), printer model, serial number, etc., pending maintenance notification, usage and/or depletion rate, the last reseller utilized, and other reseller sources. In response to interacting with peripheral device 14 and connecting with Internet 23, decision maker 50 submits an external order 55 utilizing the system of this invention. It is understood that web information 46 comprises part numbers for consumables, alternative part numbers for consumables, and selection information for a reseller.

As shown in FIG. 2, it is understood that one-to-one bidirectional communication occurs between users 48 of PC 12 and peripheral device 14. It is also understood that decision maker 50 of PC 12 pulls data in the form of web information 46 from Internet 23. It is understood that the decision maker is not necessarily a person who is immediately using printer 16. For example, user 48 might be a child, whereas decision maker 50 is a parent. It is also understood that a number of different forms of interaction can occur. Users 48 and decision maker 50 can use an existing application interface, can review a hard copy report, can view a web interface, or can interact using JAVA.

FIG. 3 illustrates another environment 200 for which consumable order-assistance system of FIG. 1 can be configured to have a first set of functionality levels for an unmanaged, small office environment. More particularly, users 48, each on a PC 12, interact in one-to-one bidirectional communication with a plurality of peripheral devices 14, 114, and 214. Additionally, the service provider 150, such as a small office maintainer and/or administrator 151 or a printer buyer 152, communicates via one or more PCs 12 bi-directionally to poll computer peripheral device 114 which comprises a Legacy printer. Service provider 150 receives web information 46 from the Internet 23. Furthermore, service provider 150 receives event push information from peripheral device 14 which comprises a laser printer having an embedded web server. Furthermore, service provider 150 receives additional event push information from computer peripheral device 214 comprising a multi-function peripheral device (MFP) having an embedded web server therein.

Web information 46 comprises consumable part numbers, alternative consumable part numbers, and selection information for choosing a reseller.

Users 48 bi-directionally interact with devices 14, 114, and 214 to obtain consumable levels, media levels and types, warnings and/or notifications, job assurance, and printer capabilities. Such interactivity occurs using a software application that provides such information, such as HP ToolBox, a commercially available product from Hewlett-Packard Company, of Palo Alto, Calif.

For the case of the small office maintainer and/or administrator 151, such individual receives information on when to replace a consumable, what consumables to replace, alternative parts needing maintenance, issue urgency, proactive warning of next issue(s), printer model, serial number, etc., impending maintenance notification, yields, last reseller utilized information, and other reseller source information. Such individual then submits an external order 155 to a reseller. In one instance, such submission is made via Internet 23. For the case of printer buyer 152, interaction provides job accounting information and bill back information.

Various forms of interaction occur within the environment depicted in FIG. 3. Such interaction for users 48, service provider 150, small office maintainer and/or administrator 151, and printer buyer 152 can occur using an existing application interface. Alternatively, it can occur using e-mail, a pager, a maintenance ticket, a hard copy report, an extended data interface (EDI), a web interface, or a JAVA application.

FIG. 4 illustrates a third environment 300 for which consumable order-assistance system of FIG. 1 can be configured to have a first set of functionality levels for an enterprise environment. More particularly, an enterprise environment solution comprises a centralized management database provided on a server 212. Web information 46 is provided to database 211 by polling data from Internet 23. More particularly, web information 46 comprises consumable part numbers, alternative consumable part numbers, and information for selecting a reseller. Users 48 each use a PC 12 to communicate on a one-to-one relation bi-directionally with computer peripheral devices 14, 114, and 214. As was the case with the environment depicted in FIG. 3, computer peripheral device 14 comprises a printer having an embedded web server. Computer peripheral device 1 14 comprises a Legacy printer. Furthermore, computer peripheral device 214 comprises a multi-function peripheral (MFP) having an embedded web server.

Users 48 interact with devices 14, 114, and 214 to obtain information on consumable levels, media levels and types, warnings and/or notifications, job assurance, and printer capabilities. Such interaction occurs with a software application such as HP ToolBox, available from Hewlett-Packard Company, of Palo Alto, Calif.

Service provider 250 interacts via one or more PCs 12 with database 211. More particularly, service provider 250 comprises a maintainer 251 operating on a PC 12, a consumables buyer 252 also operating on a PC 12, and the management information system (MIS) manager and/or printer buyer 253 utilizing a PC 12.

Maintainer 251 interacts with database 211 to determine when to replace consumables, what consumables to replace, alternative parts for peripheral devices, issue urgency, proactive warning of next issue(s), printer location and owner/contact information, printer model, serial number, etc., and impending maintenance notification. Consumables buyer 252 interacts with database 211 to obtain information on when to buy consumables, what consumables to buy, urgency, usage and/or depletion rate, inventory management, alternative parts, yields, last reseller, and other reseller sources. Consumables buyer 252 submits an external order 255 to a reseller. One implementation entails the consumables buyer 252 submitting an external order to Internet 23.

Finally, MIS manager/printer buyer 253 interacts with database 211 to obtain information on job accounting, bill back, maintenance management, usage information, and printer loading/traffic information.

Interaction of service providers 250 can exist in a number of ways. For example, service provider 250 and users 248 can interact utilizing an existing application interface. Alternatively, they can interact using e-mail, pager, maintenance ticket, hard copy reports, extended data interface (EDI), a web interface, or a JAVA application.

Finally, centralized management database 211 in one form comprises an existing application such as OpenView 5.x, a network management software solution from Hewlett-Packard Company, of Palo Alto, California. OpenView supports SNMP and CMIP protocols. Furthermore, OpenView is an enterprise-wide network management solution. Alternatively, a Tivoli management software application for e-business applications, available from Tivoli Systems, Inc., of Austin, Texas, can also be utilized.

Irrespective of the specific environment, a consumable order-assistance system is provided for computer peripheral devices including a personal computer, at least one computer peripheral device, a communication link, and a user interaction site. The personal computer has a messaging system. Each computer peripheral device has a messaging system. The communication link signal couples a personal computer with a seller of a consumable for the computer peripheral device. The user interaction site is configured to receive a notification from the computer peripheral device via the messaging system of a need to order a consumable. The user interaction site is provided with either a single-connection environment as an end user interface, an unmanaged network environment as a workgroup administrator interface, or a server-based centralized network environment as a centralized network administration interface.

In one case, the personal computer and the computer peripheral device are connected with a bus, and the user interaction site comprises a printer driver of the personal computer which is provided within a single-connection environment.

In another case, the personal computer and the computer peripheral device are provided within an unmanaged network environment, the user interaction site comprises an embedded web server within the computer peripheral device, and the embedded web server generates and forwards a message to a user at the personal computer to prompt ordering of a consumable.

According to yet another embodiment, the personal computer and the computer peripheral device are provided within a network environment having a central server. The user interaction site comprises a network administrator personal computer communicating with the server, and a network management application is provided on the server which generates and forwards a message to a network administrator.

According to an additional embodiment, the user interaction site comprises a centralized administrator interface including a centralized purchaser. The centralized order-assistance tool of a network server delivers a notification to the centralized purchaser of a need to order a consumable. According to even other embodiments, the user interaction site comprises a user interface of the personal computer. According to yet even another embodiment, the user interaction site comprises a user interface for facilitating user access to the computer peripheral device in order to receive notification of a need to order a consumable for the computer peripheral device.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A consumable order-assistance system for computer peripheral devices, comprising:
   a personal computer having a messaging system;
   at least one computer peripheral device having a messaging system communicating with the messaging system of the personal computer;
   a communication link, signal coupling the personal computer with a seller of a consumable for the computer peripheral device;
   a server having a centralized management database including part numbers for consumables for the at least one computer peripheral device and alternative part numbers for alternative consumables for the at least on computer peripheral device; and
   a user interaction site configured to receive a notification from the computer peripheral device via the messaging system of the personal computer of a need to order a consumable and further configured to enable a user to retrieve an alternative part number for an alternative consumable for one of the at least one peripheral device;
   wherein the user interaction site is provided within one of: a single-connection environment as an end user interface; an unmanaged network environment as a workgroup administrator interface; and a server-based centralized network environment as a centralized system administrator interface.

2. The consumable order-assistance system of claim 1 wherein the personal computer and the computer peripheral device are connected with a bus, and wherein the user interaction site comprises a printer driver of the personal computer provided within a single-connection environment.

3. The consumable order-assistance system of claim 1 wherein the personal computer and the computer peripheral device are provided within an unmanaged network environment, the user interaction site comprises an embedded web server of the computer peripheral device, and the embedded web server generates and forwards a message to a user at the personal computer to prompt ordering of a consumable.

4. The consumable order-assistance system of claim 1 wherein the personal computer and the computer peripheral device are provided within a network environment having a central server, the user interaction site comprises a network administrator personal computer communicating with the server, and a network management application provided on the server generates and forwards a message to a network administrator.

5. The consumable order-assistance system of claim 1 wherein the user interaction site comprises a centralized administrator interface comprising a centralized purchaser, and wherein a centralized order-assistance tool of a network server delivers a notification to the centralized purchaser of a need to order a consumable.

6. The consumable order-assistance system of claim 1 wherein the user interaction site comprises a user interface of the personal computer.

7. The consumable order-assistance system of claim 1 wherein the user interaction site comprises a user interface for facilitating user access to the computer peripheral device to receive notification of a need to order a consumable for the computer peripheral device.

8. A computer-implemented self-adjusting consumable order-assistance system which implements a program in which consumable components of computer peripheral devices are replenished, the system comprising:
   a personal computer having a messaging system;
   at least one computer peripheral device having a messaging system communicating with the messaging system of the personal computer;
   a communication link, signal coupling the personal computer with a reseller of a consumable;
   a server having a centralized management database including part numbers for consumables for the at least one computer peripheral device and alternative part numbers for alternative consumables for the at least on computer peripheral device; and
   a user interface comprising an end user interaction interface, a workgroup administrator interface, or a centralized system administrator interface, the end user interaction interface including the personal computer configurable for interaction by a user that is exchanging information with a computer peripheral device associated with the personal computer, the workgroup administrator interface operative to manage one computer peripheral device at a time, the centralized system administrator interface communicating with a server of a centralized network environment and further configured to enable a user to retrieve an alternative part number from the database for an alternative consumable for one of the at least one peripheral device.

9. The system of claim 8 wherein the end user interaction system comprises a printer driver of the personal computer.

10. The system of claim 8 wherein the workgroup administrator interface cooperates with an embedded web server of the computer peripheral device.

11. The system of claim 8 wherein the centralized system administrator interface cooperates with a network management application usable by a network administrator.

12. The system of claim 8 wherein the end user interaction system is provided within a single-connection environment comprising the personal computer communicating with the computer peripheral device via a bus, and wherein a single user has dedicated access to the personal computer.

13. The system of claim 8 wherein the workgroup administrative interface comprises an embedded web server within the computer peripheral device, and wherein the embedded web server comprises an interface for the order-assistance system.

14. The system of claim 8 wherein the centralized system administrator interface comprises a centralized order-assistance tool, and wherein the centralized order-assistance tool is provided within a centralized network environment having a server.

15. The system of claim 8 wherein the computer peripheral device comprises an embedded web server, and wherein the personal computer and the computer peripheral device are provided within an unmanaged network environment, and the embedded web server initiates ordering of a consumable in response to a detected need to replenish the consumable.

* * * * *